United States Patent [19]
Lajoie

[11] Patent Number: 5,451,117
[45] Date of Patent: Sep. 19, 1995

[54] KEYED ALIGNMENT SYSTEM

[75] Inventor: Robert M. Lajoie, Windsor, Canada

[73] Assignee: W. Tregaskiss, Ltd., Canada

[21] Appl. No.: 185,683

[22] Filed: Jan. 24, 1994

[51] Int. Cl.6 .................. B25J 17/00; B23K 3/00; F16B 3/06
[52] U.S. Cl. .................. 403/356; 403/362; 403/13; 901/42
[58] Field of Search .......... 219/125.1; 279/102, 279/103, 87, 83; 901/42; 403/355, 356, 13, 14, 362

[56] References Cited

U.S. PATENT DOCUMENTS

| | | | |
|---|---|---|---|
| 92,860 | 7/1869 | McKinney | 403/355 |
| 1,552,060 | 9/1925 | Kramer et al. | 219/125.1 |
| 3,433,512 | 3/1969 | Kraft | 403/356 X |
| 4,171,656 | 10/1979 | Gargrave | 279/87 X |
| 4,185,938 | 1/1980 | Pareja | 403/362 X |
| 4,540,869 | 9/1985 | Yasuoka | 901/42 X |
| 4,636,135 | 1/1987 | Bancon | 414/730 |
| 4,645,901 | 2/1987 | Scholz et al. | 219/125.1 |
| 4,656,329 | 4/1987 | Moerke | 219/136 |
| 5,010,228 | 4/1991 | Nishiwaki | 219/86.25 |
| 5,174,694 | 12/1992 | Voellmer | 408/124 |

FOREIGN PATENT DOCUMENTS

| | | | |
|---|---|---|---|
| 263871 | 9/1927 | United Kingdom | 403/356 |
| 290835 | 5/1928 | United Kingdom | 403/362 |
| 438405 | 11/1935 | United Kingdom | 219/125.1 |

*Primary Examiner*—Anthony Knight
*Attorney, Agent, or Firm*—Basile and Hanlon

[57] ABSTRACT

An alignment system for a robotic gun assembly comprising a dual-keyed alignment system having a gun mounting arm comprising a keyway with a positive stop that corresponds to a key on the gun housing, and a second keyway with a positive stop within the gun housing that corresponds to a key on the robotic gooseneck.

1 Claim, 2 Drawing Sheets

KEYED ALIGNMENT SYSTEM

FIELD OF THE INVENTION

The present invention relates to a robotic gun assembly having an alignment system that provides quick and easy maintenance and replacement of the assembly components.

BACKGROUND OF THE INVENTION

Many types of manufacturing operations require a high degree of precision. In addition, other manufacturing operations require tasks where human activity is inaccessible or hazardous. In such operations a tool or the like is automatically manipulated by a robot machine or gun under program control. The use of robotic machinery increases productivity and profitability for the manufacturer. After constant and regular use, robotic parts may wear and need maintenance; or an occasional crash may occur requiring repair. The time while the robotic machinery is in service, or down time, can critically jeopardize the manufacturer's business. Previously, when robotic gun assemblies were dismantled, the down time was extensive because there was no quick and easy means to precisely reassemble the robotic gun to maintain tool center point (TCP) every time.

SUMMARY OF THE INVENTION

It is accordingly an object of the invention to make it technologically simpler, less expensive and more efficient to change robotic gun assemblies. It is also an object to maintain "down time" of the assembly process at a minimum. Further, it is an object of the invention to reassemble the components of the robotic gun in the precise alignment to maintain the established TCP. To achieve the above objectives, the robotic gun assembly of the invention has a double keyed precision system that allows replacement of the vital main components without having to remove the entire gun from the clamp.

In general, the robotic gun assembly consists of a gun mount arm, a gun housing, and a gooseneck. The gun mount arm attaches to the robotic gun at one end and a robot safety clutch at the other end. At the end attached to the robotic gun, there is a circular aperture for receiving the gun housing. On the interior circumference of the circular aperture at a designated position is an elongated keyway groove. At a designated point on the exterior surface of the gun housing is an elongated key which coincides to the keyway on the robotic gun mount arm for precise alignment.

The robotic gun housing encloses a conduit assembly. At one end of the gun housing is a connector cone and cone nut which provides mechanical and electrical connection. The connector cone and cone nut have an axial through aperture which allow engagement of the gooseneck to the electric conduit within the gun housing. Along the circumference of the through aperture, the connector cone contains a second keyway with a positive stop for alignment of the gooseneck.

The gooseneck is a copper conductor tube that is wrapped in an aluminum jacket. The gooseneck matingly engages with the connector cone and cone nut fittings within the gun housing. The gooseneck has a built-in key that corresponds with the keyway of the connector cone, allowing the gooseneck to be inserted within the gun housing in only one particular way. Once the gooseneck has been inserted within the gun housing, the gooseneck can be locked in place by a locking thumb screw located on the outside of the gun housing.

This double key precision alignment system allows an operator to replace a gooseneck easily and quickly. The operator simply loosens the locking thumb screw and slides the old gooseneck out and replaces it by slipping in a new one. The precision keyed alignment system lines up the gooseneck to the gun housing for fast accurate alignment every time without having to remove the entire gun from the clamp. In addition, changing the entire gun assembly can be easily accomplished without reprogramming. The housing of the robotic gun fits precisely into the positive stop keyway on the gun mount arm clamp. Thereby, this invention allows the operator to quickly replace the gun and get back into production without the delay of reestablishing a tool center point (TCP).

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 3:
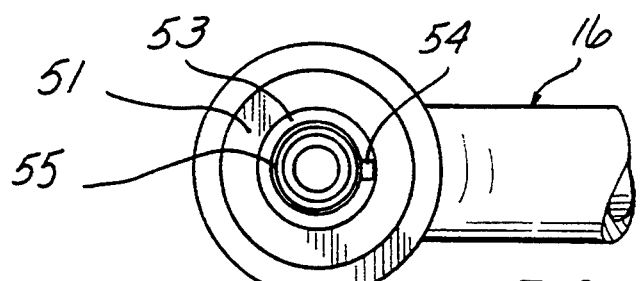
FIG. 3 is a sectional view of the gooseneck of the preferred embodiment.
Figure 1:
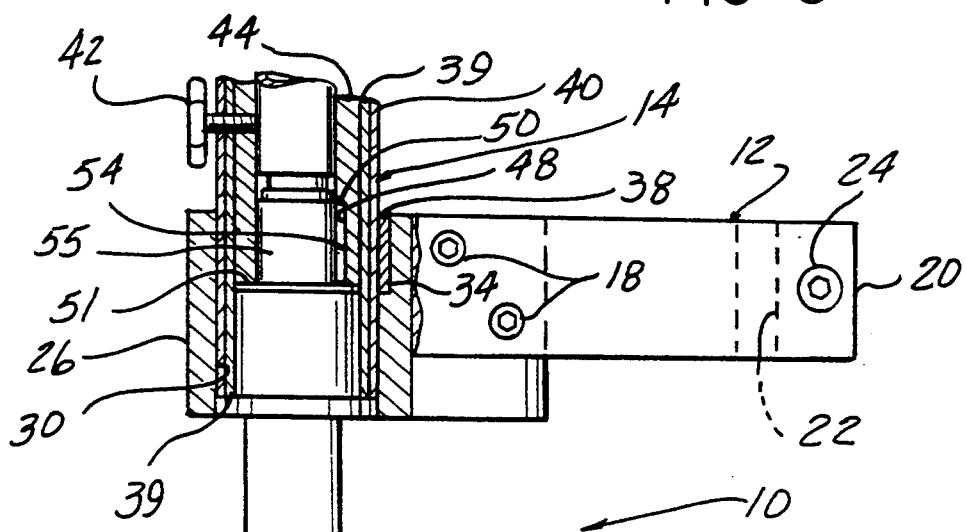
FIG. 1 shows the robotic gun assembly displaying a gun mount arm, a gun housing and a gooseneck, and illustrating the features of the preferred embodiment.
Figure 2:
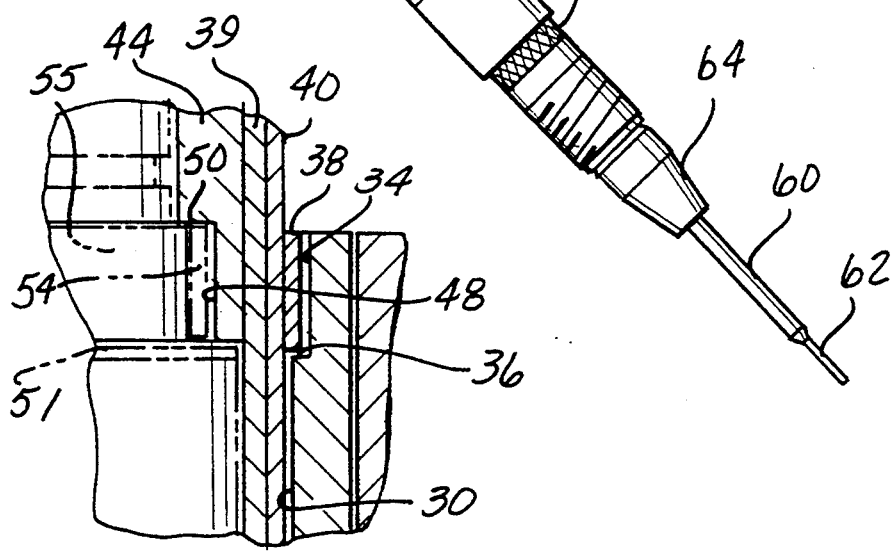
FIG. 2 is an enlarged partial view of FIG. 1 showing the gooseneck in phantom and displaying the dual-keyed alignment system of the preferred embodiment.
Figure 4:
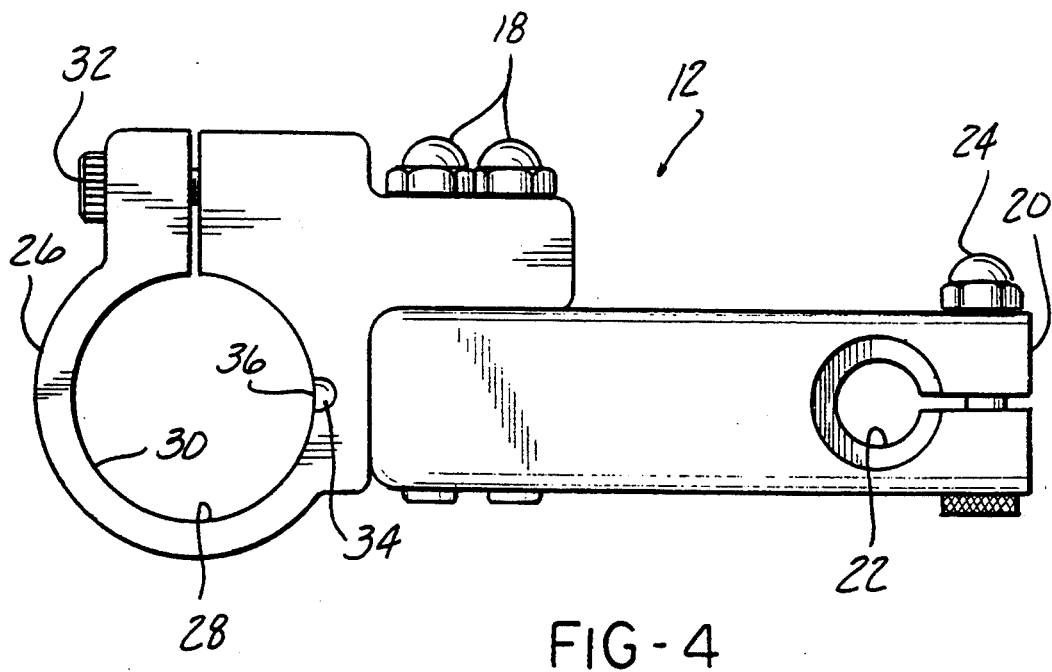
FIG. 4 is a side view of the gun mount arm illustrating a keyway.

Referring to FIGS. 1-5, there is illustrated a portion of a robot machine generally designated by the numeral 10 including a gun mount arm 12, a gun housing 14 and a gooseneck 16. The gun mount arm 12, as seen best in FIGS. 1 and 4, is a precision made instrument, manufactured from an aluminum alloy, preferably from 6061 aluminum alloy. The gun mount arm 12 of the preferred embodiment is composed of two parts rigidly held together by a pair of nuts and bolts 18. Proximate to a first end 20 of the gun mount arm 12 is a through aperture 22 for receiving a connector of a robot safety clutch (not shown). In the preferred embodiment, the robot safety clutch is designed to protect the robotic gun 10 and the expensive investment in tooling during a "crash" situation. The connector is tightened in place in the gun mount arm aperture 22 by a screw and nut combination 24. At the distal end 26 of the gun mount arm 12 is a second through aperture 28 for receiving the gun housing 14. The aperture 28 features a wide bearing surface 30 to provide stability to the inserted gun housing 14. The gun housing 14 is securely held in place by two adjacent clamping screws 32 (only one shown in FIG. 4) that provide strong equal pressure on the gun housing 14. The through aperture 28 has an elongated keyway 34 cut into the wide bearing surface 30 and extending axially approximately ⅓ of the way through aperture 28. The keyway 34 includes a positive stop 36 where keyway 34 ends. The gun housing 14 has a corresponding elongated key 38 that is adaptable to be received in the keyway 34. As the gun housing is inserted in through aperture 28, the key 38 abuts the positive stop 36. The positive stop 36 prevents key 38 of the gun housing 14 from passing through the aperture 28 along the entire length of the wide bearing surface 30.

Figure 5:
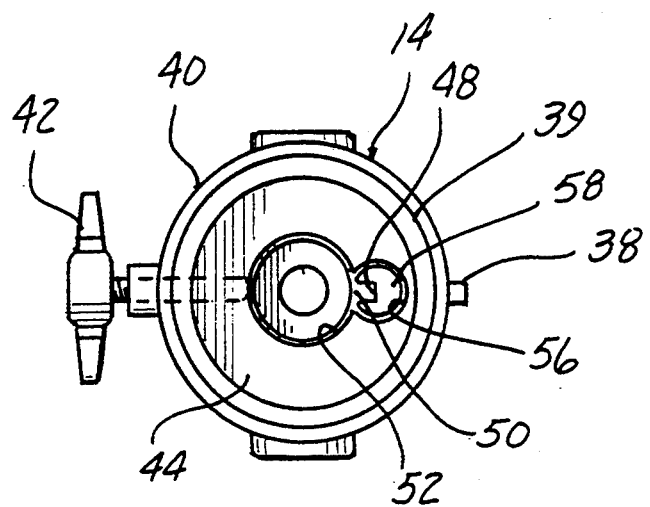
FIG. 5 is a sectional view of the gun housing unit illustrating a second keyway.

The gun housing 14 is an insulated tubular housing having an axial through aperture for enclosing electrical cables and connections. The gun housing 14 is preferably made of a strong light aircraft grade aluminum that is capable of maintaining its shape under tight clamping pressure. Insulation 39 provides added clamping strength to housing 14. Externally the gun housing 14 has an elongated key 38 on its outer aluminum surface 40 that coincides in shape and length to the keyway 34 in the gun mount arm 12. A locking thumb screw 42 provides access to tightening the connections within the gun housing 14. Internally, compression style connector cone and nut fittings 44 are inserted to provide mechanical and electrical connections. The connector cone 44 contains a keyway 48 with a positive stop 50 in its internal surface wall 52 that corresponds to a key 54 on the gooseneck 16. As seen in FIG. 5, the keyway 48 of the connector cone 44 is provided by drilling a frusto-cylindrical aperture 56 axially through the brass of the connector cone 44, and then press-fitting a stainless steel insert 58 corresponding to the frusto-cylindrical shaped aperture 56 that has a notch that defines the keyway 48. The stainless steel keyway 48 is a more durable material than brass or copper for sustaining frequent insertion and removal of key 54 into keyway 48. The positive stop 50 acts as a guide to accurately position the gooseneck 16 in the gun housing 14.

The gooseneck 16 is an insulated, thick walled copper conductor tube that is wrapped in an aluminum or stainless steel jacket that is capable of dissipating heat quickly. The insulation 53 further armors the gooseneck 16 to prevent bending and breaking. Extending beyond the aluminum jacket is a copper neck 55. The copper neck 55 is slidingly received into the connector cone and nut fittings 44 when assembled. An O-ring 51 provides a seal between the aluminum jacket on the gooseneck and connections 44 in the gun housing 14. The gooseneck 16 is manufactured with a built-in key 54 to provide for a quick change of the gooseneck 16 without having to remove the entire gun. The key 54 of the preferred embodiment is a stainless steel key that lies against the copper neck 55 adjacent the O-ring 51. The key 54 size and shape coincide with keyway 48 located within the gun housing 14. Although the gooseneck 16 as shown in FIG. 1 is bent at a particular angle it is apparent by the description that the gooseneck may be manufactured to be straight or bent at any desired angle. The robotic gun assembly 10 of the preferred embodiment further comprises thick walled nozzles 60 machined from hard drawn copper, highly conductive copper contact tips 62, and a heavy duty retaining head 64 to supply even gas flow.

The use of the double keyed precision alignment system of the present invention allows an operator to replace a gooseneck 16 instantly. The operator simply loosens the locking thumb screw 42, slides out the old gooseneck, and slips in a new gooseneck. The double keyed precision alignment system lines up the gooseneck 16 to the gun housing 14 for fast accurate alignment every time without having to remove the entire gun from the clamp. In addition, the invention also allows an easy change of the entire gun assembly 10 without reprogramming. The robotic gun 10 incorporates the keyed gun housing 14 that fits precisely into a positive stop keyway 34 on the gun mount arm clamp 12. This system allows the operator to quickly replace the gun and get back into production without the delay of reestablishing a TCP.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An alignment system for a robotic gun assembly, said robotic gun assembly comprising a gun mount arm, a gun housing and a gooseneck;

said gun mount arm having a through aperture having a wide bearing surface for receiving the gun housing;

said wide bearing surface comprising a first elongated keyway and a first positive stop;

said gun housing having an outer surface and comprising a first elongated key on the outer surface adaptable for engaging in the first elongated keyway, connector fittings enclosed within the housing and a locking thumb screw, said connector fittings comprising a second elongated keyway and a second positive stop, wherein the connector fittings have a frusto-cylindrical aperture axially drilled partially through said fittings, and a stainless steel insert press-fitted into the frusto-cylindrical aperture; said stainless steel insert having a notch defining the second elongated keyway, said gooseneck comprising a second key adaptable for engaging in the second elongated keyway, whereby the gun housing is slidingly received in the gun mount arm wherein the first elongated key slides into the first keyway thereby abutting to the first positive stop and the gooseneck is slidingly received into the gun housing wherein the second elongated key slides into the second keyway, thereby abutting to the second positive stop; wherein the locking thumb screw lockingly secures the gooseneck within the gun housing.

* * * * *